US006818084B2

(12) United States Patent
Blackmann

(10) Patent No.: US 6,818,084 B2
(45) Date of Patent: Nov. 16, 2004

(54) METHOD AND APPARATUS FOR BONDING AN ADDITIONAL LAYER OF FABRIC TO A LABEL

(75) Inventor: Frederick August Blackmann, Barrington, NH (US)

(73) Assignee: Pittsfield Weaving Co., Inc., Pittsfield, NH (US)

( * ) Notice: Subject to any disclaimer, the term of this patent is extended or adjusted under 35 U.S.C. 154(b) by 0 days.

(21) Appl. No.: 10/192,855

(22) Filed: Jul. 11, 2002

(65) Prior Publication Data

US 2003/0024634 A1 Feb. 6, 2003

Related U.S. Application Data

(60) Provisional application No. 60/337,186, filed on Dec. 4, 2001, and provisional application No. 60/305,338, filed on Jul. 13, 2001.

(51) Int. Cl.[7] .......................... B32B 31/18; B32B 3/04; B41M 7/00; G08B 13/14; G09F 3/00

(52) U.S. Cl. .................... 156/73.3; 156/73.4; 156/251; 156/277; 156/308.4; 340/572.1; 283/81; 428/58; 40/628; 40/675

(58) Field of Search .......................... 40/625, 628, 675; 156/73.1, 73.3, 73.4, 174, 176, 250, 251, 258, 261, 266, 269, 277, 308.2, 308.4; 340/572.1; 283/81, 83; 428/33, 57, 58

(56) References Cited

U.S. PATENT DOCUMENTS 4,474,637 A * 10/1984 Kempf .................... 156/380.5
4,500,372 A * 2/1985 Mion ........................ 156/73.3
4,752,351 A 6/1988 Lunt
4,847,934 A 7/1989 Weber
5,624,514 A * 4/1997 Frowein ..................... 156/148
5,863,383 A 1/1999 Bussey
6,437,985 B1 * 8/2002 Blanc et al. ................ 361/749

FOREIGN PATENT DOCUMENTS

CA 2304844 A1 * 4/1999 .......... G06K/19/77
WO WO 00 50239 8/2000

OTHER PUBLICATIONS

Notification and International Search Report mailed Sep. 19, 2002.

* cited by examiner

*Primary Examiner*—Richard Crispino
*Assistant Examiner*—Sing P. Chan
(74) *Attorney, Agent, or Firm*—Nixon Peabody, LLP

(57) ABSTRACT

The present invention includes a method for producing individual folded labels having an additional layer of material attached thereto. A ribbon of labels is provided along with an additional strip of material. Pieces of information, such as text or a machine readable-code are applied to the strip of material. The ribbon of labels and material strip with printed information thereon are joined together and then subdivided into individual folded labels. A label-making apparatus includes a mechanism for advancing the ribbon of labels and strip of material and a print head that prints the information on the strip of material at spaced intervals. A mechanism joins the ribbon of labels with the material strip. A cutting station subdivides an individual label from the ribbon of labels and material strip. A sensor in communication with the advance mechanism controls the advance of a length of the ribbon of labels and material.

10 Claims, 7 Drawing Sheets

FIG. 4A
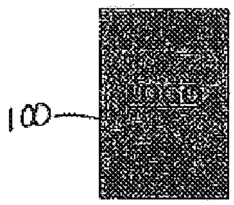
FIG. 4B
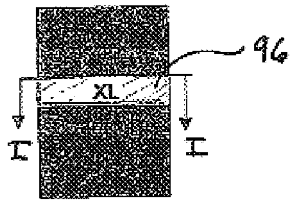
FIG. 4C
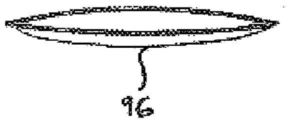
FIG. 5
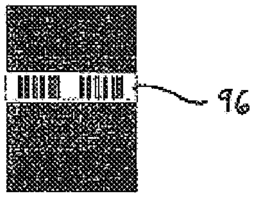
FIG. 6C
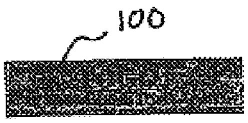
FIG. 6A
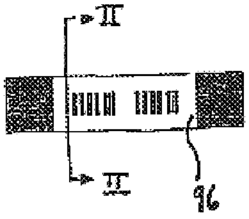
FIG. 6B FIG. 7B
FIG. 7A
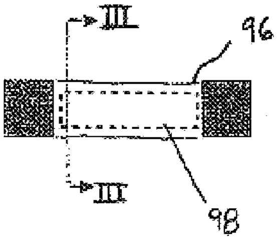
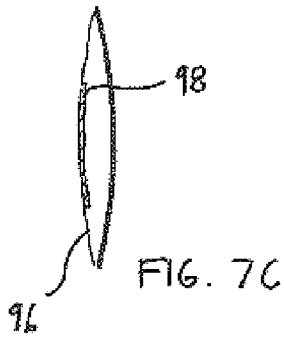
FIG. 7C

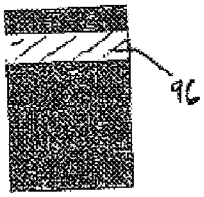
FIG. 8A
FIG. 8B
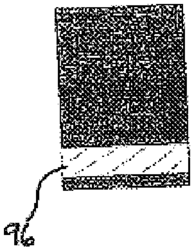
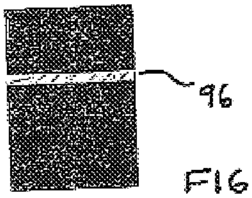
FIG. 8C
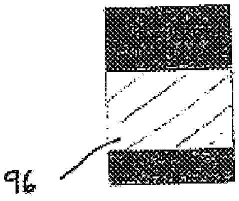
FIG. 8D
FIG. 8E
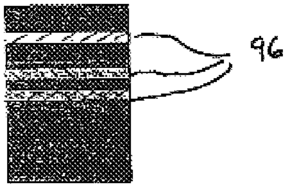
FIG. 8F
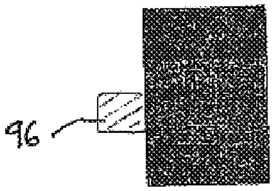
FIG. 8G
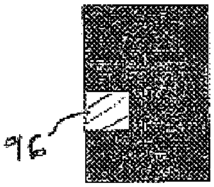
FIG. 8H
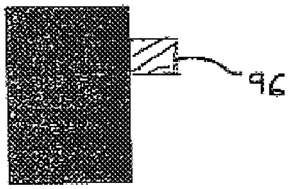
FIG. 8I

METHOD AND APPARATUS FOR BONDING AN ADDITIONAL LAYER OF FABRIC TO A LABEL

RELATED APPLICATIONS

This application claims priority of U.S. provisional application Ser. No. 60/305,338 filed Jul. 13, 2001 and 60/337,186 filed Dec. 4, 2001.

This application is also related to co-pending U.S. patent application Ser. No. 09/603,234 entitled "Method and Apparatus for Production of Labels"; Ser. No. 10/143,867 entitled "Method and Apparatus for Production of Labels"; and Ser. No. 10/143,842 entitled "Method and Apparatus for Production of RF Labels."

BACKGROUND OF THE INVENTION

1. Field of the Invention

The present invention relates to a method and apparatus for bonding an additional layer of fabric to the cut edges of a label for application to clothing, linens, towels, and other goods, and more particularly to a label having an additional layer of fabric with printed or woven information bonded thereto produced by the apparatus and method of the invention.

2. Description of the Related Art

The attachment of labels to cloth goods such as clothing, linens and towels is a common practice used to set forth information such as trademarks and trade names, material identification and characteristics, sizes, care instructions, and so forth. In addition, legal requirements necessitate the use of labels in clothing or on linens. A method and apparatus for producing individual folded labels from a ribbon of labels is presented in published PCT application WO 00/50239 and is incorporated in its entirety herein.

Folded labels are commonly used in the industry and come in a number of different forms including endfolds, centerfolds, J folds, Booklet fold, Manhattan-folds, and mitrefold labels. While each of these different forms has a particular use, the centerfold and endfold labels are the most popular.

In addition to providing this important information, the label is part of the object. Unfortunately, it is not unusual for a label, especially a skin contact clothing label, to irritate the customer. This can result in the customer forming a negative attitude regarding the quality of the entire garment. Quite often the customer will cut the offending label out of the garment. This not only prevents the customer from having the proper care instructions, it also removes the product identification from the garment, further reducing repeat sales.

Currently most folded labels are produced using what is referred to in the industry as the "cut and fold" technique, that is the labels are indexed, cut from a ribbon of material and then folded. Using this technique about 40–220 labels can be produced a minute with between 5–20% of the labels being considered waste or defective. The most common defect being a distorted fold resulting in the ends of the label not aligning properly. Other defects include turned corners, fanning, and protruding fold-unders.

Defective labels can significantly increase the cost of the goods. For example, while it costs only about fifteen to twenty-five cents to sew a label into a garment in the United States, it can cost five to ten times this amount to replace a defective label. Many labels, especially centerfold, have a tendency to skew while being sewed, thereby increasing the chance for a poor impression.

In many cases of using labeling on a garment, there are variable pieces of information which may be needed, differing from garment to garment. These bits of multiple information can be presented on a single label, causing the need for small runs in production, which raises production costs. Multiple labels for size and special instructions can also be used. This too adds to production costs because sewing time for the garment manufacturers is increased.

It would be desirable to produce large productions runs of a main label and include additional variable pieces of information on a smaller piece of fabric attachable to the main label at the point of label processing.

SUMMARY OF THE INVENTION

An object of the present invention is to attach an additional strip or layer of material to a label without the need for additional sewing steps or costly production runs.

Another object of the present invention is to provide information, such as text or a machine readable-code on the additional strip or layer of information.

In accomplishing these and other objects of the present invention, there is provided a method for producing individual folded labels having an additional layer of material attached thereto. A ribbon of labels is provided along with an additional strip of material, a jacquard woven label or a printed label may be used. Pieces of information, such as text or a machine readable-code are applied to the strip of material by printing, engraving, embossing, burning or weaving the same at spaced intervals on the material, printing is preferred. The ribbon of labels and the strip of material having the printed information thereon are joined together. The ribbon of labels with the strip of material are subdivided into individual folded labels.

In accomplishing these and other objects of the present invention, there is also provided a label-making apparatus having a mechanism for advancing a ribbon of labels and a strip of material. Means apply information on the strip of material at spaced intervals. Means join the ribbon of labels with the strip of material. A cutting station subdivides an individual label from the ribbon of labels and strip of material. A sensor in communication with the linear advance mechanism controls the advance of a length of the ribbon of labels and the strip of material.

These and other objects, features, aspects, and advantages of the present invention will become more apparent from the following detailed description of the preferred embodiment relative to the accompanied drawings, in which:

BRIEF DESCRIPTION OF THE DRAWINGS

FIG. 4A is a front view of a label having an additional strip of material attached thereto.

FIG. 4B is a back view of the label of FIG. 4A and FIG. 4C is a cross-section of the label taken along line I-I of FIG. 4B.

FIG. 5 is a back view of a centerfold label having an additional strip of material with a bar-code printed thereon.

FIG. 6A is a front view of an endfold label having an additional strip of layer of material attached thereto.

FIG. 6B is a back view of the label of FIG. 6A.

FIG. 6C is a cross-section of the label taken along line II-II of FIG. 6B.

FIGS. 7A–7C illustrate a label having an additional layer or strip of material and an anti-theft/radio frequency device incorporated therein.

FIGS. 8A–8I illustrate a plurality of centerfold labels having an additional strip of material according to the present invention.

DETAILED DESCRIPTION OF PREFERRED EMBODIMENTS

Figure 1:
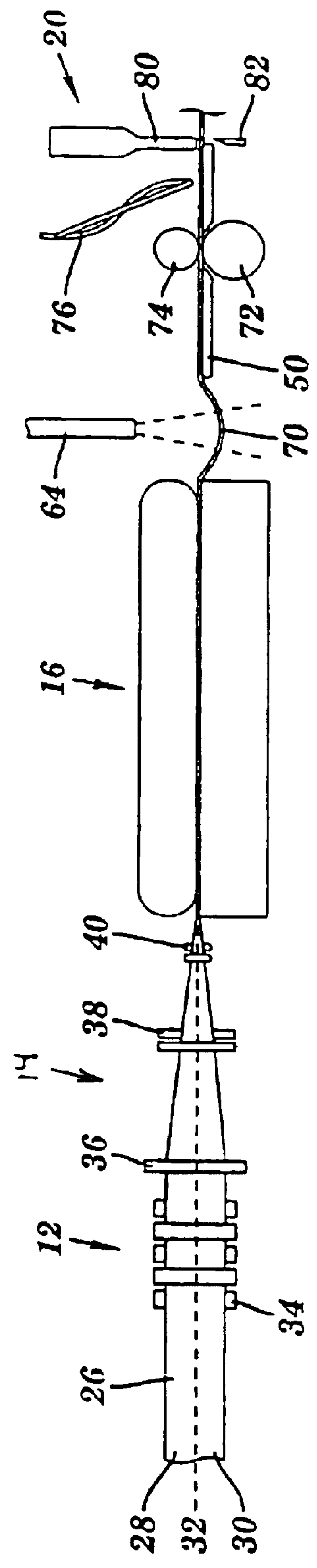
FIG. 1 is a perspective view of an apparatus for producing a centerfold label.

For a general understanding of the features of the present invention, reference is made to the drawings, wherein like reference numerals have been used throughout to identify identical or similar elements. FIG. 1 is a perspective view of a label producing apparatus in a centerfold configuration. The apparatus of FIG. 1 includes a tension equalizer assembly 12, a folding station 14, a pressing station 16, and a cutting station 20.

A roll of a ribbon of material containing labels 26 is placed on a tension let-off device (not shown). Regulating tension from the let-off device to press station 16 is important for controlling the ribbon of material 26 during the folding process. As shown in FIG. 1, the upper edge 28 and lower edge 30 of the material 26 must be maintained at essentially equal tensions. The centerline 32 of material 26 is the main control for this adjustment. Centerline 32 is preferably setup equal to the centerline of the press unit 16 and the folding station 14. Raising or lowering the roll from this point can be done to equalize the tensions in the upper and lower edge of the material.

The ribbon of material 26 can be composed of virtually any material that can be cut and pressed including a thermoplastic material (e.g., polyester), acetate, cotton, nylon, linen, paper, rayon and combinations thereof, in woven and non-woven form. Polyester is preferred. The labels can be printed on non-woven, printed on woven or jacquard woven. Jacquard woven is preferred.

It is preferred that the logo of the label is made such that it is 90 degrees from the typical orientation used in broadloom, needleloom or shuttleboom weaving of woven labels. For woven labels this can be readily done on existing jacquard harness repeats. The change of orientation greatly reduces "window shading" (i.e., curling after laundering) and decreases shrinkage when the product is exposed to heat at temperatures above 275° F.

As shown in FIG. 1, the ribbon of material 26 is then guided through a series of adjustable equalizing rollers 14 that make up the tension equalizer assembly 12, to provide an even distribution of tension. After emerging from the equalizing rollers, the ribbon is guided over a folding rod 36. It is preferable that the location of folding rod 36 be kept in center with folding lenses 38 and 40 along centerline 32. Material angle is kept from 5°–170°, more preferably 30°–90°. The distance from folding rod 36 to press unit 16 is dictated by the loom cut width of the material being folded. The wider the tape/ribbon cut, the further folding rod 36 is located from press unit 16.

After passing over the folding rod 36, the ribbon of material 26 enters folding station 14. For producing a centerfold label folding station 14 comprises two folding lenses 38 and 40. Folding lenses 38 and 40 are pivotally mounted on supports and can be adjusted vertically. The lenses are a caliper-like device comprising two adjustable jaws. The lenses restrain and guide the material into an even consistent fold. Lens 38 is a guiding lens used for making for slight adjustments before the material enters lens 40, the working lens that brings the ribbon to a fold. In certain situations a proper fold can be obtained using more or less that two lenses.

The folded material exits the folding station 14 and enters press station 16. The press station 16 subjects the folded material to both heat (100°–400° F.) and pressure. The press station 16 can have multiple heat zones that can be controlled separately. The first heat zone can be designed to carry most of the heat and the heat zones can be designed as a cool down area. The settings of the press station 16 are dictated by the type of material being processed. Thicker materials require a higher press setting and more heat, while thinner materials require less.

The folded pressed ribbon exits the press station and is led to the cutting station 20. A range sensor 64 is used to monitor the slack 70 of the material 26 between press 16 and the plate support and through a control unit. The speed of press 16 is trimmed to stay consistent with the advancing material and the delays set for cut time and acceleration and deceleration of the servo motor (not shown).

Upon advance of the material, downward pressure from roll 74 is dependent on material thickness, and structure. Thinner, looser structure materials require low pressure. Thicker and more stable structures of material require a higher downward pressure.

To maintain the proper alignment for materials with logos and written instructions, such as woven or printed labels, an observation system such as a fiber optic eye 76 is used, which reads color contrast as material advances past its read point. The material advances accelerating from a full stop. When a registration point passes under eye 76 or when eye 76 sees a color change an immediate interrupt signal is sent to the controller, at this point the servo motor, via roller 72, advances the material the distance set in the operator interface. The deceleration is calculated so that the material advance will be accurate to +/−0.05 mm. At this point the material remains stopped for the cutting, e.g., knife delay time set on the operator interface. The material then advances and follows the same sequence above.

A typical setting for the advance is the width of the label (length along loom cut edge) minus 5 mm. This number may be adjusted to influence centering of the logo. Additional adjustment can be made if necessary.

The material is cut at the cutting station 20 to form folded labels using an ultrasonic system comprising a horn 80 and anvil 82. For example, ultrasonic horn 80 has sound waves moving through it at a frequency of 20 KHz. The residence of these waves can be magnified through proper booster and horn combination.

The anvil 82 is actuated at an adjustable pressure to collide with horn 80. The material 26 passes between born 80 and anvil 82 and is exposed to very high-localized heat, cutting and sealing the material. The larger the radius on anvil 82 the larger the seal area and the more pressure required for a cut. The default delay time for the knife up is calculated and taken into account. For example, a typical delay is 70 ms, which may be adjusted if necessary to accomplish the desired results. Ultrasonic rotary dies can also be used.

The cutting station can utilize other known cutting techniques to subdivide the ribbon into individual labels. Such techniques include, for example, cold or hot shearing knives, hot fuse knives that squeeze off the product during cutting, extreme high mechanical pressure, high-pressure air, high-pressure water, laser cutting, rotary die cutters, and others.

Figure 2:
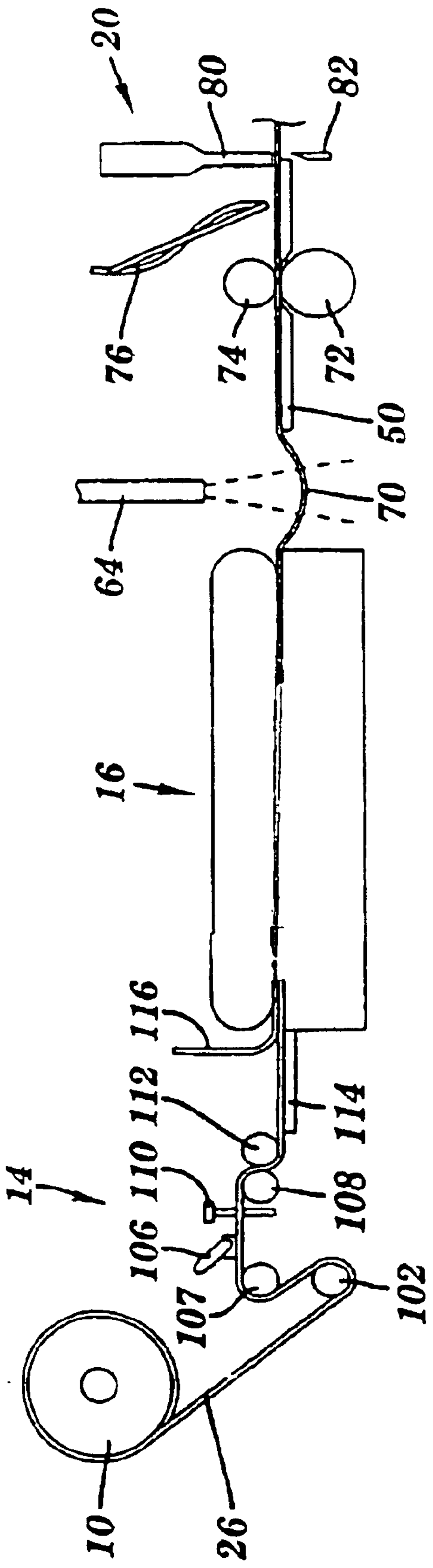
FIG. 2 is a perspective view of an apparatus for producing an endfold label.

FIG. 2 illustrates an apparatus for forming an "end-fold" label. The material 26 is distributed from tension roll 10 and passed through folding station 14. In this embodiment, the folding station 14 is comprised of services of guide rollers 102–108 and fold pins 110. Guide rollers 102 position the ribbon of material 26. Adjustable guides on rollers 102 are moved into the material edge. Guide roller 106 exerts pressure on the center of the material to prevent the ribbon from puckering in the center. Folding pins 110 fold the edges of the fabric and roller 108 holds the fold. Heat roller 112 presets the fold (100° C.–145° C.). Guide 114 holds the fold in place before the folded ribbon enters the press station 16. The press station 16 can be equipped with a hold-down spring 116 to maintain the fold in place when the press is lifted. The apparatus further includes a cutting station as depicted in FIG. 1.

Figure 3:
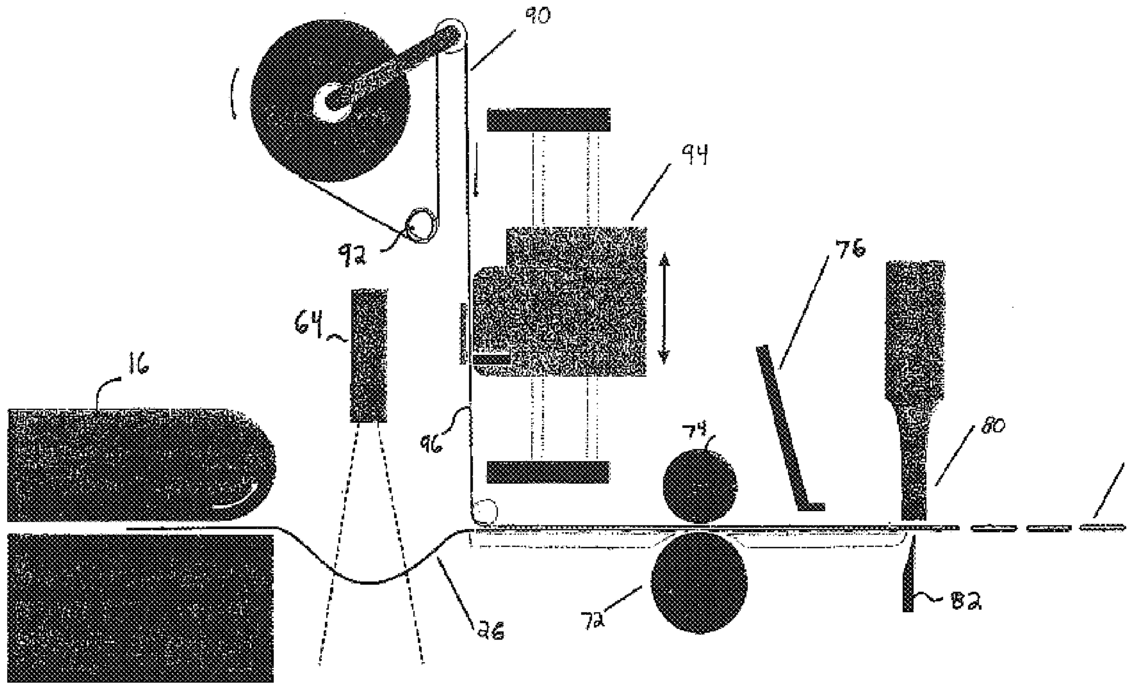
FIG. 3 is a perspective view of an apparatus for attaching an additional layer or strip of material according to the present invention.
Figure 9A:
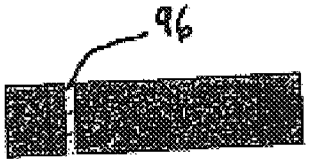
FIGS. 9A–9F illustrate a plurality of endfold labels having an additional strip of material according to the present invention.
Figure 9B:
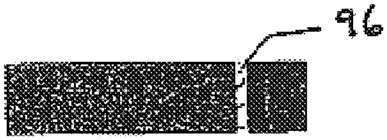
Figure 9C:
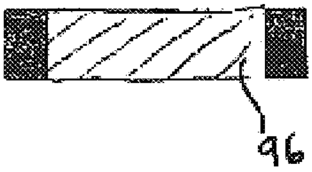
Figure 9D:
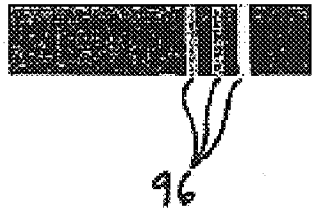
Figure 9E:
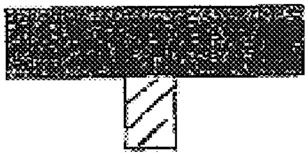
Figure 9F:

Referring to FIG. 3, an apparatus for attaching an additional layer of fabric with printed information to the cut edges of a woven or printed label is shown. The device can be incorporated with either the apparatus of FIG. 1 or 2. Linear advance mechanism 72 advances the ribbon of labels 26 forward. Simultaneously, a length of fabric ribbon 90 is advanced by mechanism 72. Fabric ribbon is delivered about a plurality of tensioning rollers 92. Both the ribbon of labels 26 and ribbon of fabric 90 are advanced forward and under optic eye 76 which reads the color contrast mark on the label ribbon and advances it to a registered location, which will be described further herein. When the advance stops the cutting station 20 including ultrasonic horn 80 and anvil 82 is activated.

At the same time the cutting station is activated, a print head 94 is also powered to write information, such as a bar code, go-code, data-matrix code, text, or any machine readable-code onto the fabric 90 in a sequential manner. Print head 94 is adjustable to align with the logo of ribbon label 26. The print head may be delayed in its activation and print once the fabric is in motion. Ink jet print heads, thermal transfer print heads, laser printing, or laser engraving may be used to transfer the data to the strip. The print head may be aligned as to register the image with the main label.

At the cutting station, the ribbon of material 26 and ribbon of fabric 90 are subdivided into individual woven labels 100 having welded, bonded and sealed edges.

As previously described, roll of ribbon of material 90 is advanced via drive mechanism or roller 72 which pulls the folded ribbon of labels 26 and fabric ribbon of material 90 forward and under fiber optic eye 76. To maintain the proper alignment for materials with logos and written instructions such as woven or printed labels, the fiber optic eye is used, which reads color contrast as material advances past its read point. When a registration point passes under the eye or when the eye sees a color change an immediate interrupt signal is sent to the controller, at this point the servo motor, via roller 72, advances the material the distance set in the operator interface. The deceleration is calculated so that the material advance will be accurate to +–0.05 mm. At this point the material remains stopped for the cutting, e.g., knife delay time set on the operator interface. The material then advances and follows the same sequence above.

A typical setting for the advance is the width of the label (length along loom cut edge) minus 5 mm. This number may be adjusted to influence centering of the logo. Additional adjustment can be made if necessary.

The material is cut at cutting station to form folded labels 100 using ultrasonic horn 80 and anvil 82. For example, the ultrasonic horn 80 has sound waves moving through it at a frequency of 20–40 KHz. The residence of these waves can be magnified through proper booster and horn combination.

Anvil 82 is actuated at an adjustable pressure to collide with the horn. The material passes between the horn and the anvil and is exposed to very high-localized heat, cutting and sealing the material. The larger the radius on the anvil the larger the seal area and the more pressure required for a cut. The strength of the bond and or seal is also influenced by the radius or surface area of the cutting anvil. The default delay time for the knife up is calculated and taken into account. For example, a typical delay is 70 ms, which may be adjusted if necessary to accomplish the desired results. Ultrasonic rotary dies can also be used. It is also possible to increase the strength of the sealed area of the cut edges which are perpendicular to the loom cut edge with the additional layer of fabric. This is done by the added material which is presented during a cut, providing more material for a strong bond.

The resultant labels have a unique smooth feel based upon the process used to make them. Furthermore, thermoplastic ribbon of labels, preferably a woven polyester, is subdivided using an ultrasonic system as part of the claimed apparatus, the labels are unique in that the cut sides are bonded or welded together as illustrated in FIGS. 4A–9F. As noted above, this bonding not only prevents the label from being skewed when sewed into a garment, but also provides the edges with a generally scratchless feel.

The cutting station can utilize other known cutting techniques to subdivide the ribbon into individual labels. Such techniques include, for example, cold or hot shearing knives, hot fuse knives that squeeze off the product during cutting, extreme high mechanical pressure, high-pressure air, high-pressure water, laser cutting, rotary die cutters, and others. In the case of the fabric carrier, the fabric carrier is cut and bonded to the cut edges of the label. The fabric layer can be within a centerfold label, along the back of a centerfold label, along the front of a centerfold label along the back of an end fold label, along the front of an end fold label, along the front of an end fold label, or any of the above conditions on other labels processed on the equipment.

After cutting the finished label, the process proceeds to a packer (not shown). The packer then pushes the label into a packing box. Packing of the cut labels can also be accomplished by bagging or placing the goods in boxes through any number of methods including single column stacks in horizontal or vertical orientation, curved stacker frays, or magazine devices in a rotary or sliding configuration.

A centerfold label made according to the method and apparatus of FIGS. 1 and 3, is shown in FIGS. 4A–4C. As shown, an independent strip of material 96 having information printed or woven thereon is attached to the back of the label. This independent strip is bonded to the cut edges of the label. Moreover, multiple strips can be applied. Because the additional strip of material is bonded to the cut edges during the formation of the labels, as described with reference to FIGS. 1–3 above, no additional attachment steps are necessary.

As shown in FIG. 5, the additional strip of material 96 can have a machine readable-code printed thereon.

An endfold label made according to the method and apparatus of FIGS. 2 and 3, is shown in FIGS. 6A–6C. As shown, an independent strip of material 96 having information printed or woven thereon is attached to the back of the label. This independent strip is bonded to the cut edges of the label. Moreover, multiple strips can be applied. Because the additional strip of material is bonded to the cut edges during the formation of the labels, as described with reference to FIGS. 1–3 above, no additional attachment steps are necessary.

As shown in FIGS. 7A–7C, a radio frequency, brand protection or anti-theft device 98 can also be applied as to the additional layer or fabric, as described in co-pending U.S. patent application Ser. No. 10/143,842 entitled "Method and Apparatus for Production of RF Labels."

FIGS. 8A–8I illustrate additional options for placement of the additional strip or layer of material 96 on a centerfold label. With FIG. 8F illustrating a label with multiple strips of additional material 96. FIGS. 9A–9F illustrate additional options for placement of the additional strip of material 96 on an endfold label. It should be appreciated that placement of the strip of additional material can also occur across the front of the label and that other options not illustrated are also encompassed by the present invention.

The apparatus of the present invention can be modified at any point to include various accessories. A vision system can be included to inspect the logos and image on the material as it passes. Labels with errors are detected and removed automatically.

Additionally, the apparatus can be modified such that the cutting station the corners of the cut material are removed to provide for heightened comfort. Further, the apparatus can be modified to ultrasonically seal the open loom cut edge giving a centerfold label, for example, three ultrasonically sealed edges and one folded edge.

Specially, it will be understood that the instant invention applies to all various types of label types and is not intended to be limited by the manner in which the labels are developed.

The apparatus of this present invention may have several different folding stations or interchangeable folding stations, thus allowing the user to select different fold configurations. Alternatively, there may be a series of components that function in one overall device. The press and cutting stations are electronically linked by means of at least one sensor to coordinate operation.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

What is claimed is:

1. A method for producing individual folded labels having an additional layer of material attached thereto, the method comprising the steps of:

providing a ribbon of labels having edges and at least one folded portion parallel to the edges of the ribbon;

providing a strip of material;

applying pieces of information on the strip of material;

joining the ribbon of labels with the strip of material; and ultrasonically subdividing the ribbon of labels and strip of material into individual folded labels having at least one ultrasonically cut edge, wherein the at least one folded portion and the strip of material are bonded together along the at least one ultrasonically cut edge.

2. The method of claim 1, wherein the step of applying pieces of information further comprises the step of sequentially printing the information on the strip of material at spaced intervals on the strip of material.

3. The method of claim 2, wherein the step of applying pieces of information further comprises the step of sequentially printing text on the strip of material at spaced intervals on the strip of material.

4. A label produced according to the method of claim 3.

5. The method of claim 2, wherein the step of applying pieces of information further comprises the step of sequentially printing a machine readable-code on the strip of material at spaced intervals on the strip of material.

6. The method of claim 1, further comprising the step of attaching a plurality of radio frequency devices to the strip of material prior to the step of joining the ribbon of labels with the strip of material.

7. The method of claim 6, wherein the step of attaching the plurality of radio frequency devices to the ribbon of labels comprises presenting the strip of material with the plurality of radio frequency devices disposed thereon to the ribbon of labels and sandwiching the radio frequency devices between the strip of material and the ribbon of labels.

8. The method of claim 1, further comprising the step of sensing a position of the pieces of information prior to ultrasonically subdividing the joined strip of material and ribbon of labels.

9. A label produced according to the method of claim 1.

10. A label formed from a ribbon of woven, thermoplastic material having edges, the label comprising:

two sides perpendicular to the ribbon edges;

at least one folded portion orientated parallel to the edges of the ribbon;

a strip of material disposed on said ribbon and orientated parallel to the at least one folded portion, wherein said at least one folded portion and strip are ultrasonically bonded together along the two sides.

* * * * *

UNITED STATES PATENT AND TRADEMARK OFFICE

CERTIFICATE OF CORRECTION

PATENT NO. : 6,818,084 B2
DATED : November 16, 2004
INVENTOR(S) : Frederick August Bleckman It is certified that error appears in the above-identified patent and that said Letters Patent is hereby corrected as shown below:

Title page,
Item [75], Inventor, please correct the spelling of the inventor's last name to read:
-- Bleckmann --

Signed and Sealed this

Fifteenth Day of February, 2005

JON W. DUDAS
*Director of the United States Patent and Trademark Office*